US011969910B2

(12) United States Patent
Roberts

(10) Patent No.: US 11,969,910 B2
(45) Date of Patent: Apr. 30, 2024

(54) LARGE FORMAT TABLE-TOP CUTTING APPARATUS WITH CUTTER SAG COMPENSATION

(71) Applicant: KEENCUT LIMITED, Corby (GB)

(72) Inventor: Andrew Maurice Roberts, Peterborough (GB)

(73) Assignee: KEENCUT LIMITED, Corby (GB)

( * ) Notice: Subject to any disclaimer, the term of this patent is extended or adjusted under 35 U.S.C. 154(b) by 347 days.

(21) Appl. No.: 17/610,602

(22) PCT Filed: Feb. 7, 2020

(86) PCT No.: PCT/GB2020/000009
§ 371 (c)(1),
(2) Date: Nov. 11, 2021

(87) PCT Pub. No.: WO2020/229786
PCT Pub. Date: Nov. 19, 2020

(65) Prior Publication Data

US 2022/0234237 A1 Jul. 28, 2022

(30) Foreign Application Priority Data

May 14, 2019 (GB) ..................................... 1906805

(51) Int. Cl.
*B26D 7/26* (2006.01)
*B26D 1/04* (2006.01)
(Continued)

(52) U.S. Cl.
CPC ............... *B26D 7/26* (2013.01); *B26D 1/045* (2013.01); *B26D 5/02* (2013.01); *B26D 2007/0012* (2013.01)

(58) Field of Classification Search
CPC .. B26D 2007/0012; B26D 1/045; B26D 5/02; B26D 7/26
See application file for complete search history.

(56) References Cited

U.S. PATENT DOCUMENTS 3,207,019 A 9/1965 Vanzo et al.
3,945,866 A * 3/1976 Rudder .................. B29D 30/20
156/126
(Continued)

OTHER PUBLICATIONS

International Search Report from International Patent Application No. PCT/GB2020/000009 dated May 4, 2020, 2 pages.

*Primary Examiner* — Sean M Michalski
(74) *Attorney, Agent, or Firm* — Klintworth & Rozenblat IP LLP

(57) ABSTRACT

A large format table-top cutting apparatus includes a cutter bar assembly configured to in use support and guide a cutting head to cut material located below the cutter bar assembly; a lifting mechanism configured to raise and lower the cutter bar assembly between an upper position and a lower position The cutter bar assembly includes an elongate upper and lower supports connected by a link assembly so that these are arranged substantially parallel to one another and can move relative to one another along their longitudinal axes, and a raising assembly configured for adjustment by a user to exert a variable force on the lower part of the upper support at one end so as to place the upper support in tension and raise the free-hanging central portion of the upper support.

20 Claims, 5 Drawing Sheets

(51) Int. Cl.
*B26D 5/02* (2006.01)
*B26D 7/00* (2006.01)

(56) References Cited

U.S. PATENT DOCUMENTS

| | | | | | |
|---|---|---|---|---|---|
| 5,046,852 | A * | 9/1991 | Hametner | B21D 5/004 382/152 |
| 5,243,890 | A | 9/1993 | Ober | |
| 5,997,670 | A * | 12/1999 | Walter | B29C 63/02 156/212 |
| 7,552,842 | B1 * | 6/2009 | Carvajal | B26D 1/045 221/70 |
| 2004/0060963 | A1 * | 4/2004 | Ludwig | B23K 3/0653 228/103 |
| 2009/0151528 | A1 * | 6/2009 | Loibl | B26D 9/00 83/684 |
| 2011/0203437 | A1 * | 8/2011 | Parravano | B65H 35/002 242/588 |
| 2011/0280999 | A1 * | 11/2011 | Crystal | B26D 7/26 426/302 |
| 2012/0139987 | A1 * | 6/2012 | Maeyama | B26D 5/20 347/16 |
| 2022/0234237 | A1 * | 7/2022 | Roberts | B26D 7/26 |

* cited by examiner

LARGE FORMAT TABLE-TOP CUTTING APPARATUS WITH CUTTER SAG COMPENSATION

FIELD

The present invention relates to a large format table-top cutting apparatus with a mechanism to compensate for cutter sag. The present invention further relates to a large format table-top cutting apparatus with a mechanism to compensate for cutter sag and to assist with visual alignment of elongate materials in a cutting apparatus. The present invention yet still further relates to a method of compensating for sag in an elongate cutter bar assembly during use. The present invention yet still further relates to a method of compensating for sag in the supports of an elongate cutter bar assembly by component forming during manufacture.

BACKGROUND

Large format table-top cutters are used in many industries, such as for example the signage industry and other industries that utilise large format graphics. These types of cutters are used to cut a wide range of materials, from papers and fabrics through to rigid boards such as Aluminium Composite Panel (ACP). They generally comprise a long, straight cutter bar that is suspended at each end above a cutting surface via a lifting mechanism at each end of the bar that in use raises and lowers the bar. In use, the material to be cut is positioned on the cutting surface, and the cutter bar is then lowered onto the material so that the material is clamped into position. A sliding cutting head with a blade mounted within it is then drawn along the bar in order to cut the material lying beneath it.

For many products, accurate alignment and cutting is essential. The material is marked before the cutting operation (by hand or as part of a printing process) to produce cut marks, and is then positioned on the cutting surface so that the cutter bar is aligned with the cut marks, with the cutter bar held above the surface of the material by the lifting mechanism. Alignment is carried out by maneuvering the material below the suspended cutter bar (usually by hand) and aligning the cutting edge with the cut marks. Once correctly aligned, the cutter bar is then lowered onto the material to hold this in place (clamped between the cutting surface and the cutter bar). The cutter bar is held in position at each end and must also remain in position relative to the cut-marks whilst the cutting head is drawn along the cutter bar to make the required cut in the material.

The cutter bars are unsupported except at their ends, so that the entire width of the material can pass under the cutter bar. For longer or wider materials, a larger cutter is required, with a longer cutter bar. As the central portion is unsupported, it will tend to sag in use (the bar bending under gravity so that the central portion is lower than the supported ends) when suspended above the material to be cut. The ‘amount’ of sag will depend on the strength of the bar and it’s total operational length (the distance over which it is suspended). A typical arrangement is shown in FIG. 2. In use, as the cutter bar is lowered the sag in the central portion of the cutter bar means that the central part of the cutter bar (shown as ‘B’ in FIG. 2) contacts the material before the end portions (designated by ‘A’ in FIG. 2), which still remain above the material.

This gap between the material and the cutter bar at the regions designated by ‘A’ promotes parallax errors when an operator is aligning the cutting edge of the cutter bar to the cut marks. If the cutter bar is lowered sufficiently at each end to only just contact the material (and therefore prevent alignment parallax errors), the sag in the bar means that the central portion will be fully resting on the material and pressing down on this, and therefore free movement of the material is prevented. This makes alignment very difficult and time-consuming, as an operator will be required to raise and lower the cutter bar multiple times to make multiple small adjustments. This also increases the likelihood of inaccurate cutting and therefore wastage. Overcoming this problem requires a reasonably high level of training and practice for the user to become proficient.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY

It is an object of the present invention to provide a large format table-top cutting apparatus with a mechanism to compensate for cutter sag which goes some way to overcoming the abovementioned disadvantages or which at least provides the public or industry with a useful choice.

It is a further object of the present invention to provide a method of compensating for sag in an elongate cutter bar assembly during use.

It is a further object of the present invention to provide a method of compensating for sag in the supports of an elongate cutter bar assembly by component forming during manufacture.

The term “comprising” as used in this specification and indicative independent claims means “consisting at least in part of”. When interpreting each statement in this specification and indicative independent claims that includes the term “comprising”, features other than that or those prefaced by the term may also be present. Related terms such as “comprise” and “comprises” are to be interpreted in the same manner.

As used herein the term “and/or” means “and” or “or”, or both.

As used herein “(s)” following a noun means the plural and/or singular forms of the noun.

Accordingly, in a first aspect the present invention may broadly be said to consist in a large format table-top cutting apparatus, comprising: a cutter bar assembly configured to in use support and guide a cutting head to cut material located below the cutter bar assembly; a lifting means configured to raise and lower the cutter bar assembly between an upper position and a lower position; the cutter bar assembly comprising: an elongate upper support and an elongate lower support, the upper support located above the lower support, the upper and lower supports connected via a linking means that connects the upper and lower supports so that these are arranged substantially parallel to one another and can move relative to one another along their longitudinal axes, and; a raising means configured for adjustment by a user to exert a variable force on the lower part of the upper support at one end so as to place the support in tension and raise the free-hanging central portion of the support.

In an embodiment, the linking means comprises a tongue-and-groove.

In an embodiment, the tongue-and-groove runs substantially the length of the upper and lower supports.

In an embodiment, the connecting portion of the tongue is substantially circular in cross-section.

In an embodiment, the tongue and groove are configured so that free play is substantially 5% or less.

In an embodiment, the raising means comprises an adjustable screw configured to contact and exert force on one end of the tongue as the screw is tightened.

In an embodiment, the cutter bar assembly further comprises an end cap rigidly connecting the upper and lower supports at one end, an aperture formed in the end cap to receive the adjustable screw.

In an embodiment, the tongue is connected to the upper support.

In an embodiment, the tongue is integrally formed with the upper support.

In an embodiment, the upper and lower supports comprise bars.

In an embodiment, the bars are rectangular in profile.

In an embodiment, the bars comprise extrusions.

In an embodiment, the bars are hollow.

In an embodiment, the bars are aluminium.

In an embodiment, the bars are formed so that in normal use the upper bar is in compression and the lower bar is in tension.

In an embodiment, the lifting means comprises a pair of end pillars, located one at each end of the cutter bar assembly, at least one lever, and a torsion bar, the at least one lever connected to the torsion bar so that operation of the at least one lever lowers and raises the torsion bar, the torsion bar acting on the upper and lower supports to lower and raise the cutter bar assembly between the end pillars.

In an embodiment, the large format table-top cutting apparatus further comprises a base, the end pillars connected to the base so that material to be cut can be positioned on the base between the pillars.

In an embodiment, the large format table-top cutting apparatus further comprises a braking means configured to prevent the cutter bar assembly from dropping from a position where it is raised from or above the lower position.

In a second aspect, the invention may broadly be said to consist in a method of compensating for sag in an elongate cutter bar assembly comprising the steps of:

- constraining a first end of the cutter bar assembly;
- exerting force on the lower part of the upper bar at the second end of the cutter bar assembly.

In a third aspect, the invention may broadly be said to consist in method of compensating for sag in the supports of an elongate cutter bar assembly of the type that comprises upper and lower connected supports, by forming the upper support so that it is in compression and forming the lower support so that it is in tension, comprising the steps of:

i) rigidly fixing the supports together at a first end;
ii) bending the supports over a former;
iii) rigidly connecting the second ends of the supports together;
iv) removing the supports form the former.

With respect to the above description then, it is to be realised that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE FIGURES

Further aspects of the invention will become apparent from the following description which is given by way of example only and with reference to the accompanying drawings which show an embodiment of the device by way of example, and in which.

DETAILED DESCRIPTION

The present invention is intended to provide a mechanism by which sag in a cutter bar of any length for a large format table-top cutter can be compensated for or reduced so as to have a negligible effect in use. This will allow the cutter bar to be lifted to full height for material loading, then lowered close to but not contacting the material surface (e.g. within 1 mm) and mechanically held at this height while the material is aligned as required to an exact cut-line indicator, and then fully lowered into contact with the material while not disturbing the alignment of the material.

An embodiment of the invention is described below with reference to the relevant figures.

Figure 1:
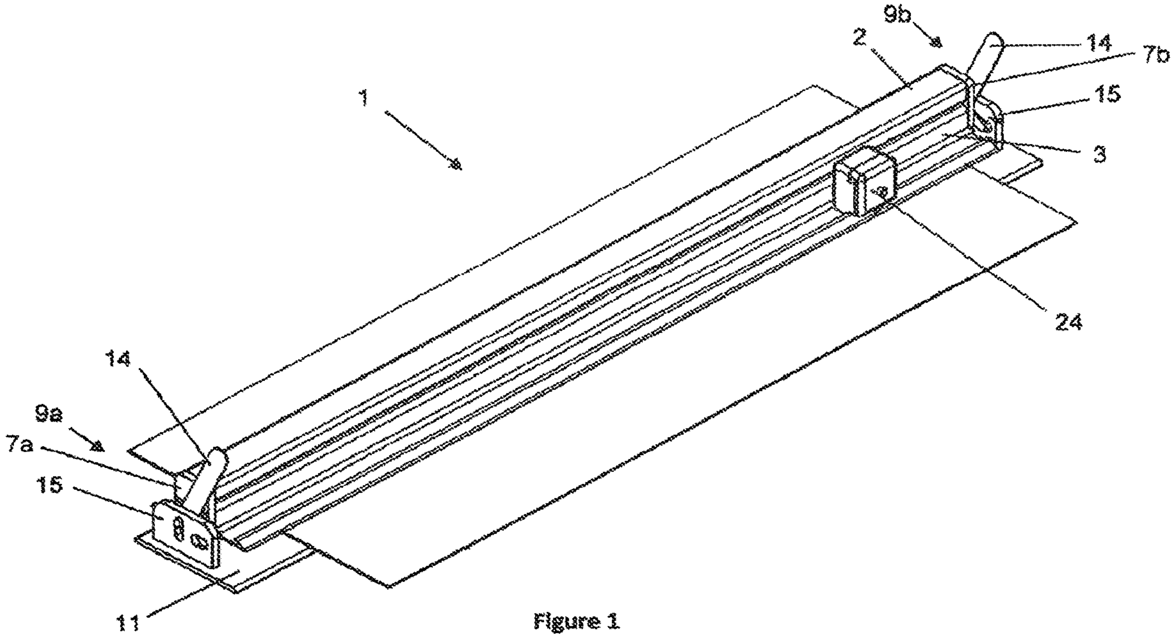
FIG. 1 shows a perspective view from one side and above of a large format table-top cutting apparatus according to an embodiment of the present invention, the cutting apparatus comprising a base configured to rest on a bench or tabletop surface or similar, two lifting assemblies that are connected to and extend upwards from the base and which are activated by levers, and a cutter bar assembly that extends between and is supported at it's ends by the lifting assemblies and raised and lowered by the lifting assemblies.
Figure 2:
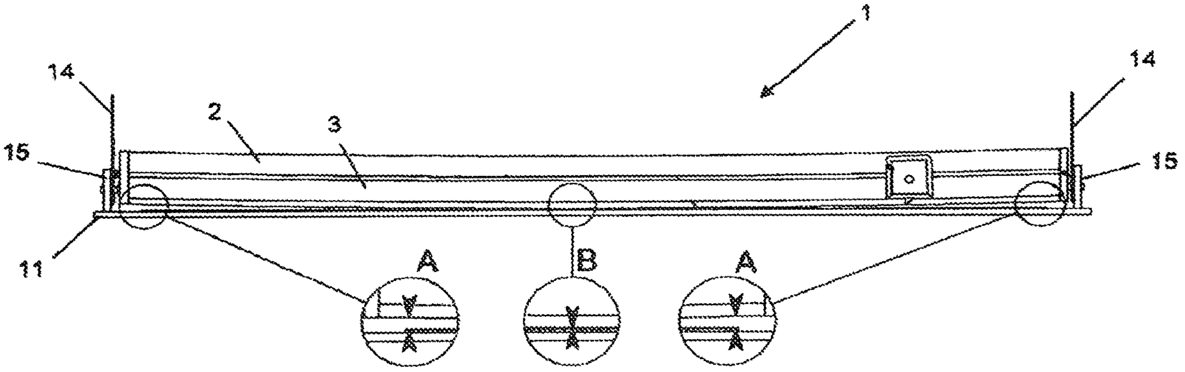
FIG. 2 shows a side-on view of a known or prior art type of large format table-top cutter, with the end regions of the cutter bar generally designated by 'A' and supported by the lifting mechanism, and the central region generally designated by 'B' and unsupported.
Figure 3:
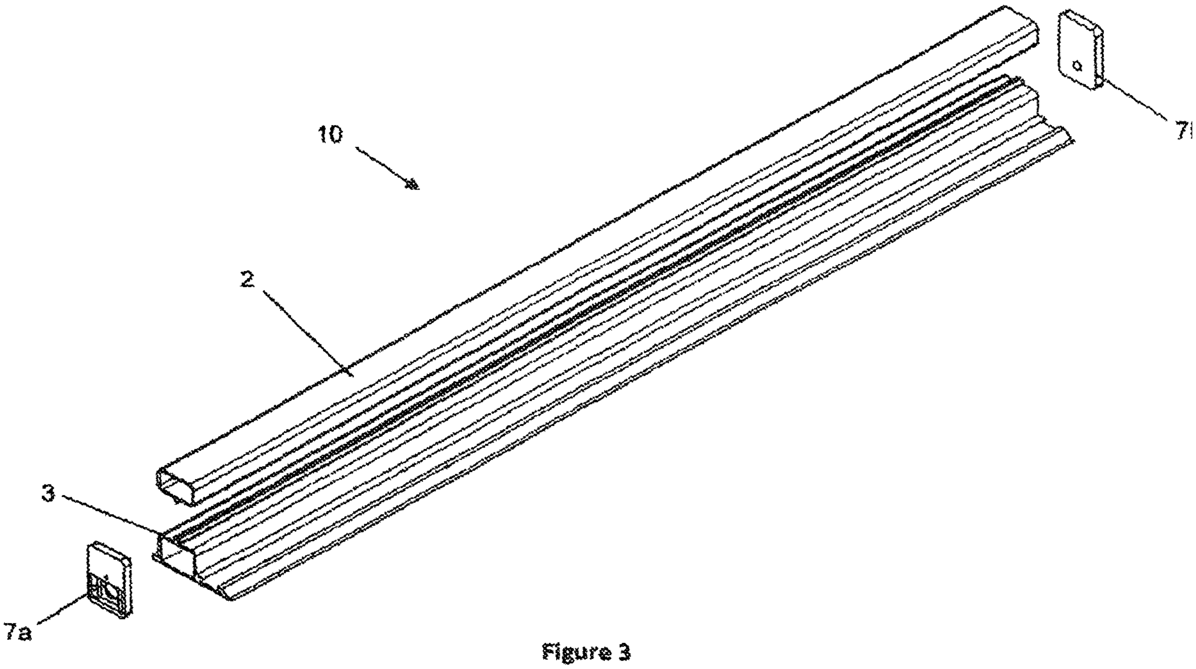
FIG. 3 shows an exploded perspective view from the same angle as FIG. 1 of the cutter bar assembly, the cutter bar assembly comprising an upper bar and a lower bar and a pair of end caps, the upper and lower bars connected via a tongue and groove arrangement that runs substantially the length of the bars 2, 3 between the two bars.
Figure 4:
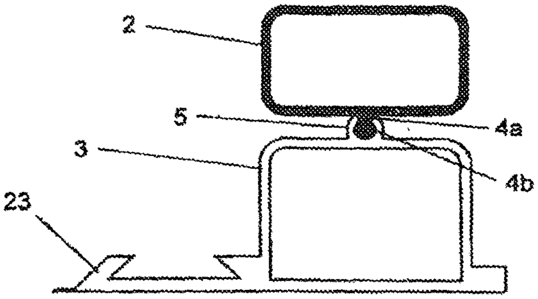
FIG. 4 shows an end view of the upper and lower bars of the cutter bar assembly of FIG. 3, and detail of the connecting tongue and groove arrangement.

A large format table-top cutting apparatus 1 is shown in FIG. 1. The cutting apparatus 1 comprises a base 11 configured to rest on a bench or tabletop surface or similar, two lifting assemblies 9*a*, 9*b* that are connected to and extend upwards from the base 11, and a cutter bar assembly 10 (shown on FIG. 3) that extends between, and is supported at it's ends by, the lifting assemblies 9*a*, 9*b*. The cutter bar assembly 10 comprises a pair of long bars—an upper bar 2 and a lower bar 3—that extend between the lifting assemblies 9*a*, 9*b*, both bars 2, 3 substantially parallel to the base 11. End caps 7*a*, 7*b* cover and connect the ends of the bars 2, 3. The lifting assemblies 9*a*, 9*b* are configured so that the cutter bar assembly 10 can be raised and lowered between the lifting assemblies 9*a*, 9*b* between a lower position where it is in contact with the base 11, to a position several centimetres above the base 11. The cutter bar assembly 10 supports a connected cutting head 24 that can run along the length of one side of the assembly, a blade in the cutting head 24 extending below the cutting head to contact and cut material on the base, below the cutter bar assembly. The upper and lower bars 2, 3 are in the preferred embodiment hollow aluminium extrusions with a rectangular cross-section, that are in use arranged so that the upper bar 2 is directly above the lower bar 3. The lower bar 3 is taller than the upper bar 2, with the bars 2, 3 having the same width. It should be noted that the two bars do not have to be the same width, and that the lower bar does not have to be taller than the upper bar. Also any suitable material and cross-sectional profile can be used—these do not have to be hollow aluminium extrusions. The upper and lower bars 2, 3 are mechanically linked along the length of their adjoining faces, this linking achieved in such a manner that they are free to slide against each other along their longitudinal axis. In this embodiment, this is achieved as shown in FIG. 4, with a tongue and groove arrangement that runs substantially the length of the bars 2, 3 between the two bars 2, 3. The upper bar 2 has a tongue 4 that runs substantially the length of the lower face of the upper bar 2, the lower part 4*a* of the tongue 4 circular in cross-section when viewed from the end of the upper bar 2, and connected to the lower face of the bar 2 via an upper tongue connection part 4*b* that is substantially square in cross-section when viewed end-on. The profile of the tongue can be any suitable shape other than circular (for example oval, square, rectangular, etc.) The groove 5 is configured to snugly receive and hold the lower part 4*a* of the tongue 4, with the upper tongue connection part 4*b* extending snugly through a slot on the top of the groove 5, so that there free movement or 'play' between the tongue 4 and the groove 5 is minimised. Although a small amount of movement is acceptable, typically 5% of the size of the groove 5, this should ideally be minimised as far as possible.

The bars are formed during manufacture so that when connected, the upper bar 2 is slightly in compression, and the lower bar 3 is slightly in tension. This ensures that the two bars are biased upwards in use, which counteracts the gravitational effect on the centre that causes sagging.

The compression and tension of the bars is achieved during manufacture, by first fixing the two bars together at one end, then bending them over a forming object placed under their centre (e.g. an upwardly-curved former), and then connecting the second ends of the bars together while they are still bent over the former. The two bars will then retain an upwards-biased bend when suspended from their ends in use. This is due to the upper bar being in compression and the lower in tension, therefore the top bar is urged to arch upwards. As they are connected along their length the top bar will support the bottom bar, and help to prevent sag.

As noted above, end caps 7*a*, 7*b* are fixed to the ends of the lower bar, with the end caps 7*a*, 7*b* profiled to cover the ends of both the upper and lower bars 2, 3. The cutter bar assembly 1 further comprises a screw adjuster 6 at one end. The screw adjuster 6 allows calibration and adjustment of the cutter bar assembly. An operator can adjust the screw 6 to alter the sag in the bars 2, 3, so that the cutter bar will in use be parallel to the surface of the material along it's length. This works as outlined below.

The end cap 7*a* comprises a threaded aperture 8 that receives the screw 6. The aperture 8 is formed so that it is in line with the lower part 4*a* of the tongue 4.

The aperture 8 is aligned with the lower part 4*a* of the tongue 4. When the screw 6 is inserted and tightened within the aperture 8, it will contact and push against the lower part 4*a*. As the bars 2, 3 are constrained at both ends, when the screw presses against the lower part 4*a*, this puts the upper bar 3 under compression at the screw end, on the underside of the bar. As the upper bar is constrained at the opposite end, it will react to this compression force by bending upwards or rising in the centre. This therefore places the lower bar under similar tension via the connection between the upper and lower bars 2, 3, and the bars 2, 3 will rise in the middle. This compressive tension force counteracts the sagging of the bars under their own weight over their length when supported only at their ends.

By adjusting the screw 6, the amount of compressive tension force or lift in the middle of the bars 2, 3 can be regulated.

Further detail of a lifting assembly 9 of the cutting apparatus 1 is shown in FIGS. 5*a* to 5*e*.

Figure 5A:
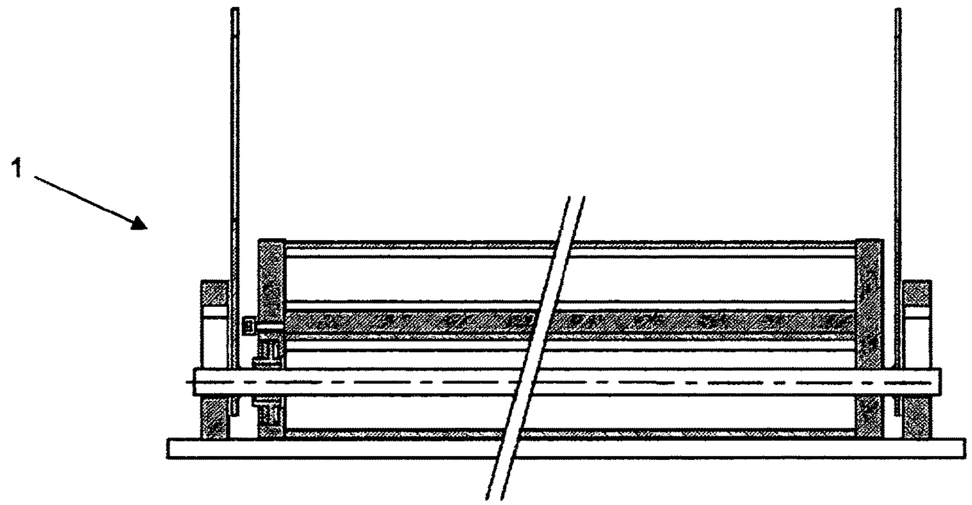
FIG. 5*a* shows a fully side-on view of the cutting apparatus of FIG. 1.
Figure 5B:
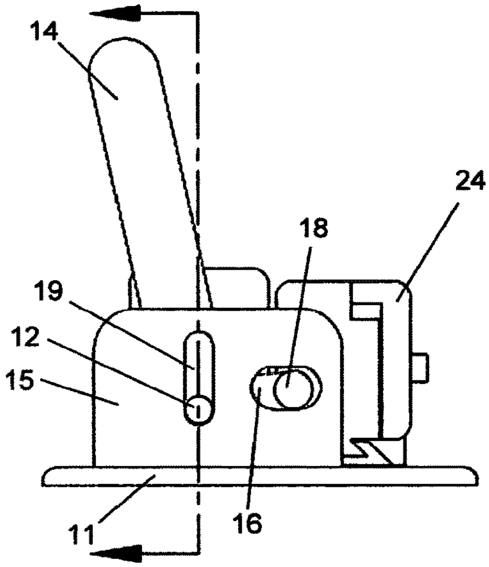
FIGS. 5*b* and 5*c* show an end view of the cutting apparatus of FIG. 5*a*, showing the lever rotated clockwise and anticlockwise to raise and lower the cutter bar assembly.
Figure 5C:
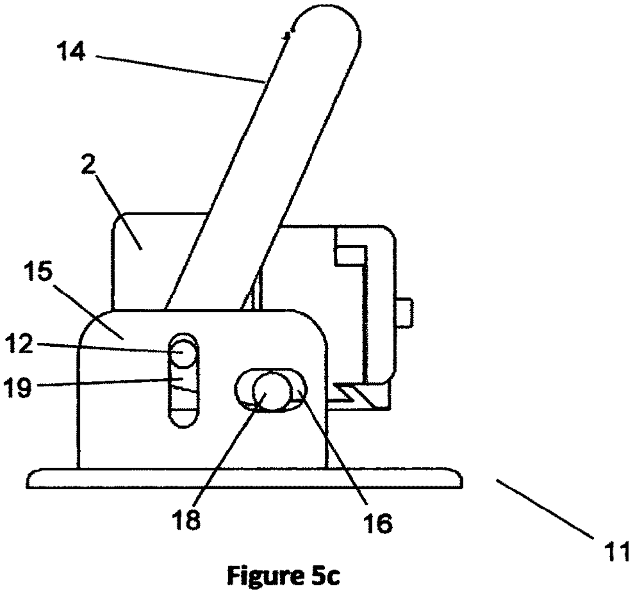
Figure 5D:
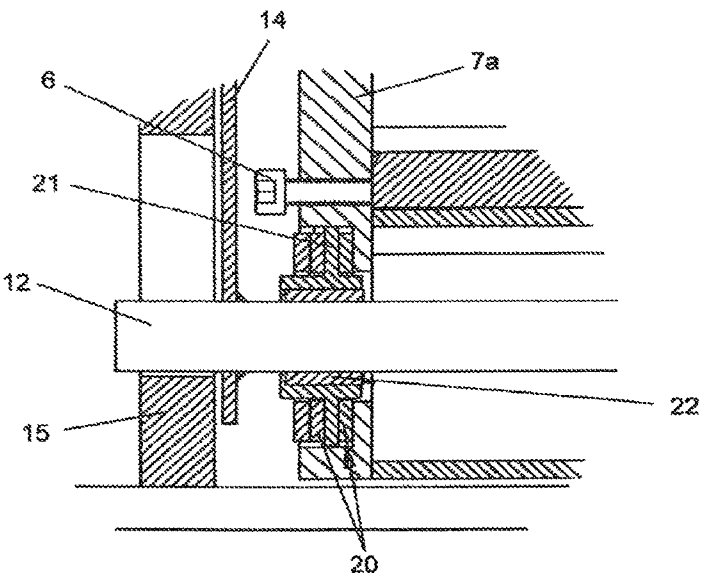
FIG. 5*d* shows a side-on cutaway detail view of a lifting assembly at one end of the cutting apparatus, the lifting assembly comprising an end pillar that connects between the base and the cutter bar assembly, a torsion bar, the lever which connects and activates the torsion bar to raise and lower the cutter bar assembly, and a brake pad, brake discs and needle clutch that are located in the end cap and which operate to prevent the cutter bar assembly dropping under its own weight.
Figure 5E:
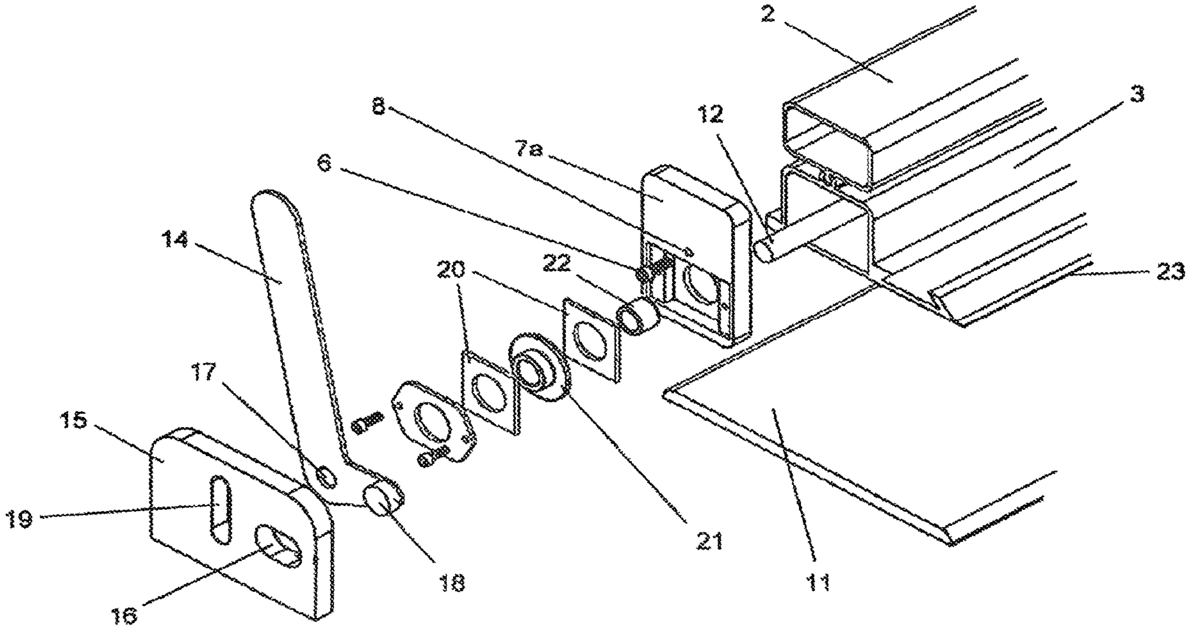
FIG. 5*e* shows an exploded perspective view of the lifting assembly of FIG. 5*d*.
Figure 6:
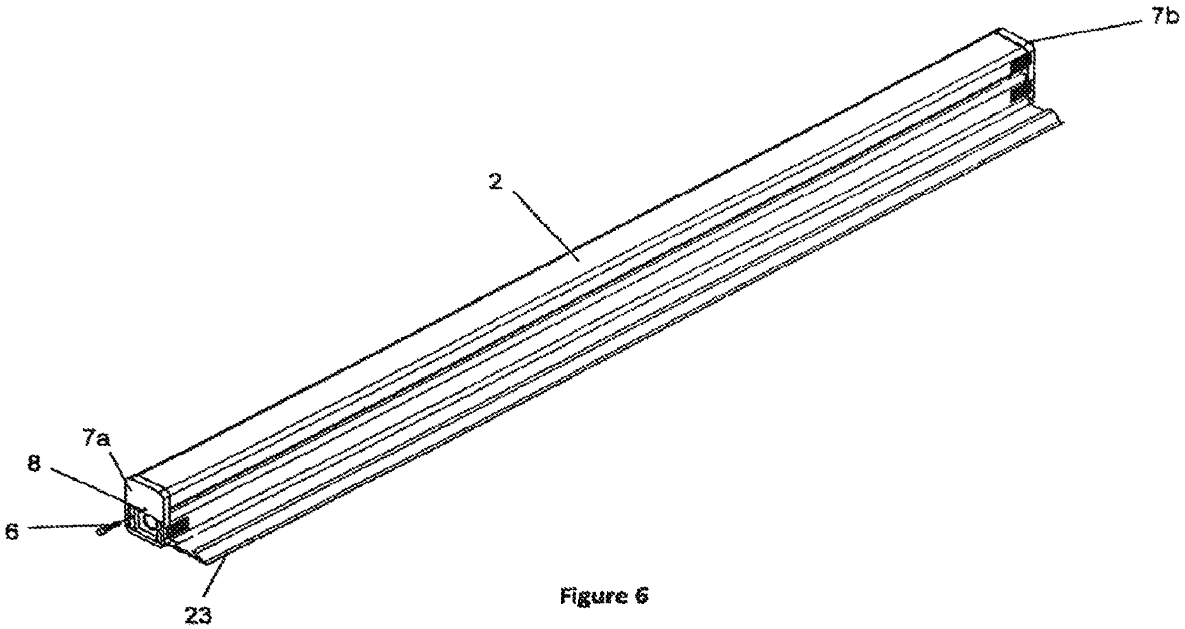
FIG. 6 shows a perspective view of the cutter bar assembly of FIGS. 1 and 3, showing the cutter bar assembly assembled and ready for use, with the upper and lower bars connected, the end caps in place, and detail of a screw adjuster formed in one of the end caps, the cutter bar assembly further having a clear plastic strip fixed to and extending from one side to guide a cutter.

As shown in FIGS. 5*d* and 5*e*, the lifting assembly 9 comprises an end pillar 15, a lever 14, and a torsion bar 12.

The end pillar 15 is rigidly fixed or attached to the base 11, extending upwards from the base 11. First and second pillar slots or apertures 16, 19 are formed through the body of the end pillar 15, having the form of elongated circles. First pillar aperture 16 extends horizontally but perpendicular to the longitudinal axis of the bars 2, 3, and second pillar aperture 19 extends vertically.

The lever 14 is a substantially 'L'-shaped flat plate, aligned in use with the upright of the 'L' extending upwards. A connection aperture 17 is formed through the lever 14 at the corner of the 'L' where the upright meets the base leg or crank arm 13 of the 'L'. A cylindrical extension 18 extends outwards sideways (towards the end pillar 15) from the outer end of the crank arm 13. The cylindrical extension 18 extends through the first pillar slot 16, and can move horizontally within slot 16, the slot 16 having the same width as the radius of the extension 18.

The torsion bar 12 is circular in cross section, with the same radius as the width of the pillar aperture 19. The torsion bar 12 extends through the vertical second aperture or second slot 19 and guides the vertical action. The slot 19 is shaped and positioned so that in use, the cutter bar can rest fully on the material being clamped. In use, the material is held in place by the weight of the cutter bar—no additional force is applied by the levers to force the cutter bar down, to hold the material in place.

The elongated or stretched nature of the first and second slots 16, 19 ensures that the extension 18 and torsion bar 19 can move backwards and forwards within their respective slots over a short distance. The main body of the torsion bar 12 extends through aperture 19 from the pillar 15, through the connection aperture 17 in the lever 14, through the end cap 7, and then into and through the hollow centre of the lower bar 3, to the lifting assembly at the opposite end of the cutting apparatus 1.

In use, an operator manipulates the torsion bar 12 via lever 14, rotating or rocking the lever 14 clockwise and anti-clockwise (when the cutting apparatus is viewed end-on, causing rotational movement of the torsion bar 12 to lift and lower the cutter bar assembly 10.

A brake pad 20 and brake discs 21 are located in the end cap **7*a* at one end only of the cutter bar assembly 10. These are pre-set to a certain level, but adjustable. The brake pad and discs 20, 21 operate through a one-way needle clutch beating 22 such that the brake only acts in a single direction, and are set such that the brake acts only to prevent the cutter bar assembly 10 dropping under its own weight, but so that the brake will not operate when the lever 14 is used and rotated to raise the cutter bar assembly 10 (therefore not adding the brake friction to the weight of the cutter bar assembly 10 when it is lifted via the lever 14**).

To enable the blade cut line to be indicated accurately and such that both sides of the cut line is visible a clear plastic strip 23 is fixed to the edge of the cutter bar, with the strip 23 trimmed by the blade of the blade assembly 24 connected to one side of the cutter bar assembly 10. This has the effect of ensuring that in use an accurate cut-line indication is provided whereby the cutter bar side of the cut-line can be viewed through the clear strip 23.

In use, the cutting apparatus 1 can be used to cut a variety of different thicknesses of material. As any sag within the cutter bar assembly 10 can be adjusted out or compensated for, it can be used so that the lower surface is within a small distance of (e.g. within 1 mm), but not contacting, the material to be cut, along the entire length of the cutter bar assembly 10.

When the blade runs along the edge of the cutter bar there must be a gap between the cutting edge and the blade. If there is no gap, the blade can wear the edge, creating filings and over time a rough edge. On the occasion that the cutter bar is used to cut to the edge of an image, if the blade runs exactly along the edge of the cutter bar it makes it difficult to achieve a precise alignment. In this instance, being able to see a small strip of the image or adjacent space along the edge of the cutter bar makes alignment easier and more accurate.

The invention claimed is:

1. A large format table-top cutting apparatus, comprising:

a cutter bar assembly configured to in use support and guide a cutting head to cut material located below the cutter bar assembly, the cutter bar assembly including an elongate upper support having an longitudinal axis and an elongate lower support having an longitudinal axis, the upper support located above the lower support, the upper and lower supports connected by a link assembly that arranges the upper and lower supports to be substantially parallel to one another and connects the upper and lower supports to enable movement relative to one another along the longitudinal axes, and a raising assembly configured for adjustment by a user to exert a variable force on a lower part of the upper support at one end so as to place the upper support in tension and raise the lower central portion of the upper support; and a lifting mechanism configured to raise and lower the cutter bar assembly between an upper position and a lower position.

2. The large format table-top cutting apparatus as claimed in claim 1 wherein the link assembly comprises a tongue formed in one of the upper and lower supports which seats in a groove formed in the other of the upper and lower supports.

3. The large format table-top cutting apparatus as claimed in claim 1 wherein the link assembly comprises a tongue formed in one of the upper and lower supports and runs substantially the length thereof, and a groove formed in the other of the upper and lower supports and runs substantially the length thereof, the tongue seating within the groove.

4. The large format table-top cutting apparatus as claimed in claim 2 wherein a connecting portion of the tongue is substantially circular in cross-section.

5. The large format table-top cutting apparatus as claimed in claim 2 wherein the tongue and groove are configured so that free play is substantially 5% or less.

6. The large format table-top cutting apparatus as claimed in claim 2 wherein the raising assembly comprises an adjustable screw configured to contact and exert force on one end of the tongue as the screw is tightened.

7. The large format table-top cutting apparatus as claimed in claim 6 wherein the cutter bar assembly further comprises an end cap rigidly connecting the upper and lower supports at one end, an aperture formed in the end cap to receive the adjustable screw.

8. The large format table-top cutting apparatus as claimed in claim 7 wherein the tongue is connected to the upper support.

9. The large format table-top cutting apparatus as claimed in claim 8 wherein the tongue is integrally formed with the upper support.

10. The large format table-top cutting apparatus as claimed in claim 1 wherein the upper and lower supports comprise bars.

11. The large format table-top cutting apparatus as claimed in claim 10 wherein the bars are rectangular in profile.

12. The large format table-top cutting apparatus as claimed in claim 10 wherein the bars comprise extrusions.

13. The large format table-top cutting apparatus as claimed in claim 10 wherein the bars are hollow.

14. The large format table-top cutting apparatus as claimed in claim 13 wherein the bars are aluminium.

15. The large format table-top cutting apparatus as claimed in claim 10 wherein the bars are formed so that in normal use the upper bar is in compression and the lower bar is in tension.

16. The large format table-top cutting apparatus as claimed in claim 1 wherein the lifting mechanism comprises a pair of end pillars, located one at each end of the cutter bar assembly, at least one lever, and a torsion bar, the at least one lever connected to the torsion bar so that operation of the at least one lever lowers and raises the torsion bar, the torsion bar acting on the upper and lower supports to lower and raise the cutter bar assembly between the end pillars.

17. The large format table-top cutting apparatus as claimed in claim 16 further comprising a base, the end pillars connected to the base so that material to be cut can be positioned on the base between the pillars.

18. The large format table-top cutting apparatus as claimed in any claim 1 further comprising a brake configured to prevent the cutter bar assembly from dropping from a position where it is raised from or above the lower position.

19. A method of compensating for sag in an elongate cutter bar assembly comprising:

constraining a first end of the cutter bar assembly; and exerting force on the lower part of the upper bar at the second end of the cutter bar assembly.

20. A method of compensating for sag in the supports of an elongate cutter bar assembly of the type that comprises upper and lower connected supports, by forming the upper support so that it is in compression and forming the lower support so that it is in tension, comprising:

i) rigidly fixing the supports together at a first end;

ii) bending the supports over a former;

iii) rigidly connecting the second ends of the supports together; and iv) removing the supports form the former.

* * * * *